United States Patent
Merlo et al.

(10) Patent No.: US 9,994,302 B2
(45) Date of Patent: Jun. 12, 2018

(54) ELEMENT FOR SOUND ABSORPTION MOUNTED ON AIRCRAFT COMPONENTS

(71) Applicant: ALENIA AERMACCHI SPA, Venegono Superiore (IT)

(72) Inventors: Emanuele Merlo, Arona (IT); Pier Giorgio Ferrante, Varese (IT); Diego Copiello, Venegono Superiore (IT); Gianni Duccini, Forte dei Marmi (IT)

(73) Assignee: ALENIA AERMACCHI S.P.A., Venegono Superiore (VA) (IT)

( * ) Notice: Subject to any disclaimer, the term of this patent is extended or adjusted under 35 U.S.C. 154(b) by 661 days.

(21) Appl. No.: 14/363,682

(22) PCT Filed: Dec. 3, 2012

(86) PCT No.: PCT/IB2012/056917
§ 371 (c)(1),
(2) Date: Jun. 6, 2014

(87) PCT Pub. No.: WO2013/084135
PCT Pub. Date: Jun. 13, 2013

(65) Prior Publication Data
US 2015/0086335 A1    Mar. 26, 2015

(30) Foreign Application Priority Data
Dec. 9, 2011 (IT) .............................. TO2011A1124

(51) Int. Cl.
*B64C 1/40* (2006.01)
*F02C 7/045* (2006.01)
*F02K 1/82* (2006.01)

(52) U.S. Cl.
CPC ................ *B64C 1/40* (2013.01); *F02C 7/045* (2013.01); *F02K 1/827* (2013.01);
(Continued)

(58) Field of Classification Search
CPC . B64C 1/40; F02C 7/045; F02K 1/827; F05D 2250/283
(Continued)

(56) References Cited

U.S. PATENT DOCUMENTS

| 2,252,256 A | 8/1941 | Huntington |
| 3,542,152 A | 11/1970 | Adamson et al. |
| 3,748,213 A * | 7/1973 | Kitching .................. F01N 1/24 |
| | | 181/292 |

(Continued)

FOREIGN PATENT DOCUMENTS

| GB | 1 490 923 | 11/1977 |
| GB | 2 478 312 | 9/2011 |

(Continued)

OTHER PUBLICATIONS

International Search Report for International Application No. PCT/IB2012/056917 dated Mar. 25, 2013 (4 pages).

*Primary Examiner* — Jeremy Luks
(74) *Attorney, Agent, or Firm* — Merchant & Gould P.C.

(57) ABSTRACT

An element (26) for sound absorption is intended for being mounted on components of aircrafts, such as engine nacelles. The element includes a face-sheet (28), which is, at least in a region thereof, acoustically permeable, a substantially sound-reflective back-sheet (30) and a honeycomb layer (32), "sandwiched" between the face-sheet (28) and the back-sheet (30) and defining a mesh structure which has hollow cells (34, 34') laterally neighboring one another. The cells (34, 34') are adapted to make the sound waves that enter through the face-sheet (28) and are reflected by the back-sheet (30) resonate inside their side walls. The element (26) has a passage (36) that connects together a group of the cells (34, 34'), thereby causing the cells to acoustically cooperate with one another.

5 Claims, 12 Drawing Sheets

(52) U.S. Cl.
CPC .... *F05D 2250/283* (2013.01); *F05D 2260/96* (2013.01); *Y02T 50/672* (2013.01)

(58) Field of Classification Search
USPC .......................................... 181/213, 214, 292
See application file for complete search history.

(56) References Cited

U.S. PATENT DOCUMENTS

| | | | | |
|---|---|---|---|---|
| 3,769,767 A | * | 11/1973 | Scott | E04C 2/365 181/288 |
| 3,905,443 A | | 9/1975 | Sieuzac | |
| 3,952,831 A | * | 4/1976 | Bernard | B32B 3/12 181/292 |
| 3,983,955 A | | 10/1976 | Vasiljevic | |
| 4,001,473 A | * | 1/1977 | Cook | B32B 3/12 181/292 |
| 4,421,201 A | * | 12/1983 | Nelsen | F02C 7/045 181/214 |
| 5,923,003 A | * | 7/1999 | Arcas | B64C 21/04 181/213 |
| 6,122,892 A | | 9/2000 | Gonidec et al. | |
| 6,182,787 B1 | * | 2/2001 | Kraft | F02C 7/045 181/292 |
| 6,371,242 B1 | * | 4/2002 | Wilson | B32B 3/12 181/210 |
| 7,510,052 B2 | * | 3/2009 | Ayle | F02C 7/045 181/213 |
| 8,047,329 B1 | * | 11/2011 | Douglas | G10K 11/172 181/292 |
| 2002/0050420 A1 | | 5/2002 | Porte et al. | |
| 2004/0163888 A1 | * | 8/2004 | Johnson | B64D 29/00 181/292 |
| 2005/0147790 A1 | * | 7/2005 | Levavasseur | E04C 2/328 428/116 |
| 2008/0020176 A1 | * | 1/2008 | Ayle | F02C 7/045 428/118 |
| 2013/0299274 A1 | * | 11/2013 | Ayle | G10K 11/172 181/292 |

FOREIGN PATENT DOCUMENTS

| | | |
|---|---|---|
| WO | WO 92/12856 | 8/1992 |
| WO | WO 2011/034469 | 3/2011 |

* cited by examiner

ELEMENT FOR SOUND ABSORPTION MOUNTED ON AIRCRAFT COMPONENTS

This application is a National Stage Application of PCT/IB2012/056917, filed 3 Dec. 2012, which claims benefit of Serial No. TO2011A001124, filed 9 Dec. 2011 in Italy and which applications are incorporated herein by reference. To the extent appropriate, a claim of priority is made to each of the above disclosed applications.

TECHNICAL FIELD

The present invention relates to an element for sound absorption, in particular intended for being mounted on components of aircrafts. More specifically, the present invention relates to an element for sound absorption according to the preamble of the appended claim 1.

PRIOR ART

In the aviation industry, elements for sound absorption (also referred to in this field as "soundproof panels") are known which are intended for installation on components of aircrafts, the function of which is to dampen the noise typically generated by an aircraft in operation.

In particular, the engines used in the aviation field generally consist of various parts or components that can significantly contribute to the generated noise, in terms of both levels and frequencies, which must then be properly dampened. Therefore, one application of such elements for sound absorption concerns engine nacelles, for the purpose of reducing the sound generated by the various parts of the engine housed in the nacelle.

SUMMARY OF THE INVENTION

It is one object of, the present invention to provide an improved element for sound absorption which is reliable and ensures better noise dampening performance compared to the prior art, and which can be manufactured in a simple and economical manner.

According to the present invention, this and other objects are achieved through an element for sound absorption.

It is understood that the appended claims are an integral part of the technical teachings provided in the present description of the invention.

BRIEF DESCRIPTION OF THE DRAWINGS

Further features and advantages of the present invention will become apparent from the following detailed description, which is supplied by way of non-limiting example with reference to the annexed drawings, wherein.

Of course, said drawings are not in scale, in that in the following detailed description they will only be used for illustrating the basic principles of the present invention.

DETAILED DESCRIPTION OF THE INVENTION

Figure 1:
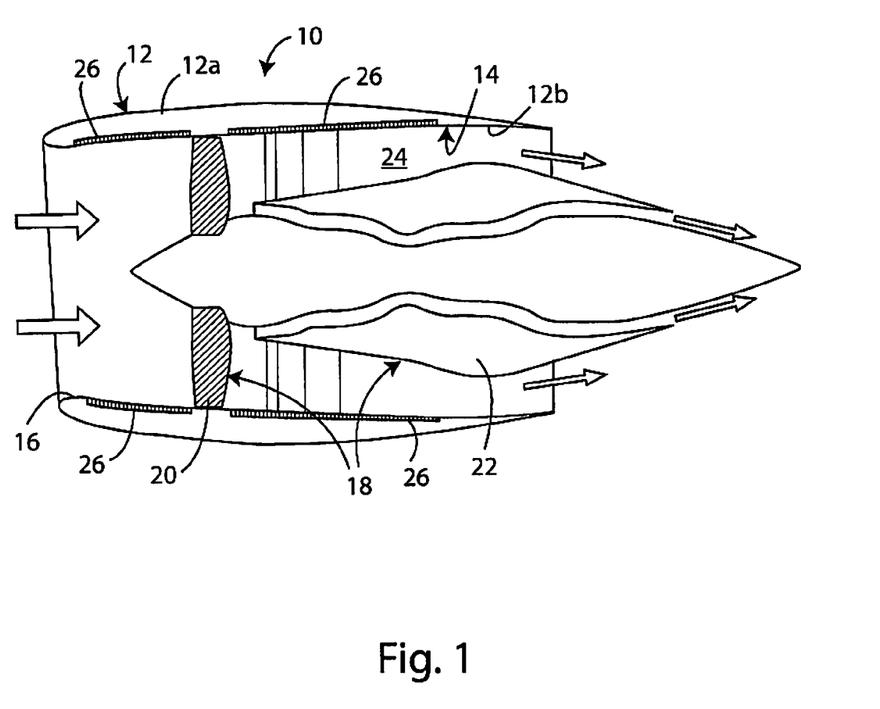
FIG. 1 is a longitudinal sectional view of a component of an aircraft, such as an engine nacelle, in which an exemplary embodiment of an element for sound absorption according to the present invention has been mounted.

With reference to FIG. 1, reference numeral 10 designates as a whole a component of an aircraft, e.g. an engine nacelle, for use in the aviation industry.

Engine nacelle 10 comprises an housing or cowling 12 having a substantially barrel-like shape and including a through cavity 14 extending in a substantially axial direction. Cowling 12 has an external peripheral surface (also known as "outer barrel") 12a facing outwards from nacelle 10 and an internal peripheral surface (also known as "inner barrel") 12b that surrounds through cavity 14. In addition, cowling 12 has an air intake 16, which is located at one end of through cavity 14 and has the function of conveying external air into the cowling.

Engine nacelle 10 further comprises a jet-type propulsion assembly 18 contained in cavity 14 and adapted to receive air from air intake 16 and accelerate it in order to generate a thrust. By way of non-limiting example, propulsion assembly 18 comprises a fan 20 and an engine 22, the former being housed upstream of the latter inside through cavity 14, thus creating a jet engine, e.g. of the turbofan type. Preferably, between cowling 12 and engine 22 a by-pass duct or annular region 24 is defined in through cavity 14 for conveying the air fraction coming from fan 20 which is not to flow through engine 22.

The structure and operation of a turbofan engine, like the one diagrammatically shown in FIG. 1, are per se known in the industry, and for simplicity they will not be described in detail below. In said drawing, the air flows going through the engine nacelle are shown, by way of example, by means of a series of arrows.

Nacelle 10 further comprises a plurality of elements for sound absorption (also known in the industry as "soundproof panels"), indicated by 26 and designed in accordance with a first exemplary embodiment of the present invention. Elements 26 are mounted in a manner such as to cover the internal peripheral surface 12b, e.g. at an inlet region, comprised between air intake 16 and upstream of fan 20, and an outlet region, downstream of fan 20, where engine 22 is mounted. In the illustrated embodiment, elements 26 form the very internal peripheral surface 12b. For example, a single element 26 forms an inlet ring, which constitutes the internal peripheral surface 12b in said inlet region; another single element 26 forms an outlet ring, which constitutes the internal peripheral surface 12b in said outlet region.

Figure 2:
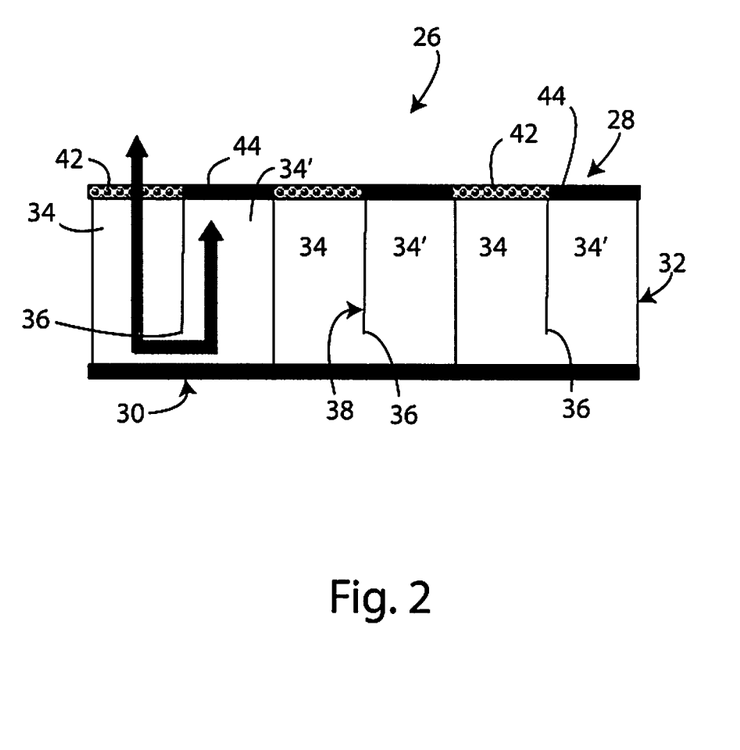
FIG. 2 is a schematic cross-sectional view of a first exemplary embodiment of an element for sound absorption according to the present invention.
Figure 3:
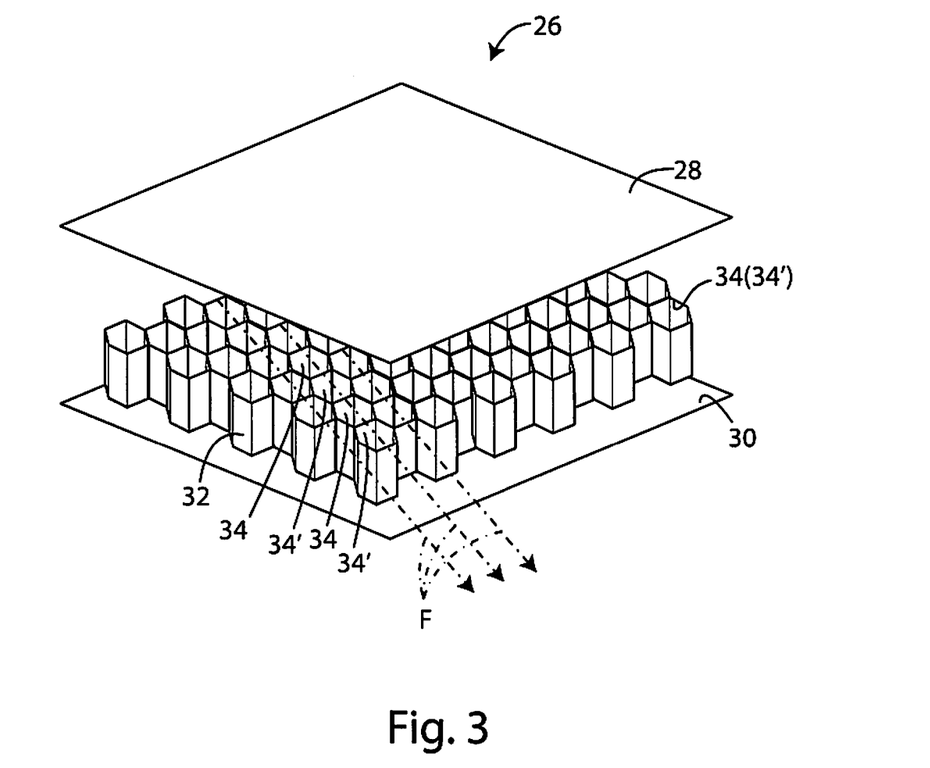
FIG. 3 is a schematic perspective and partially exploded view of the element for sound absorption shown in FIG. 2.
Figure 4:
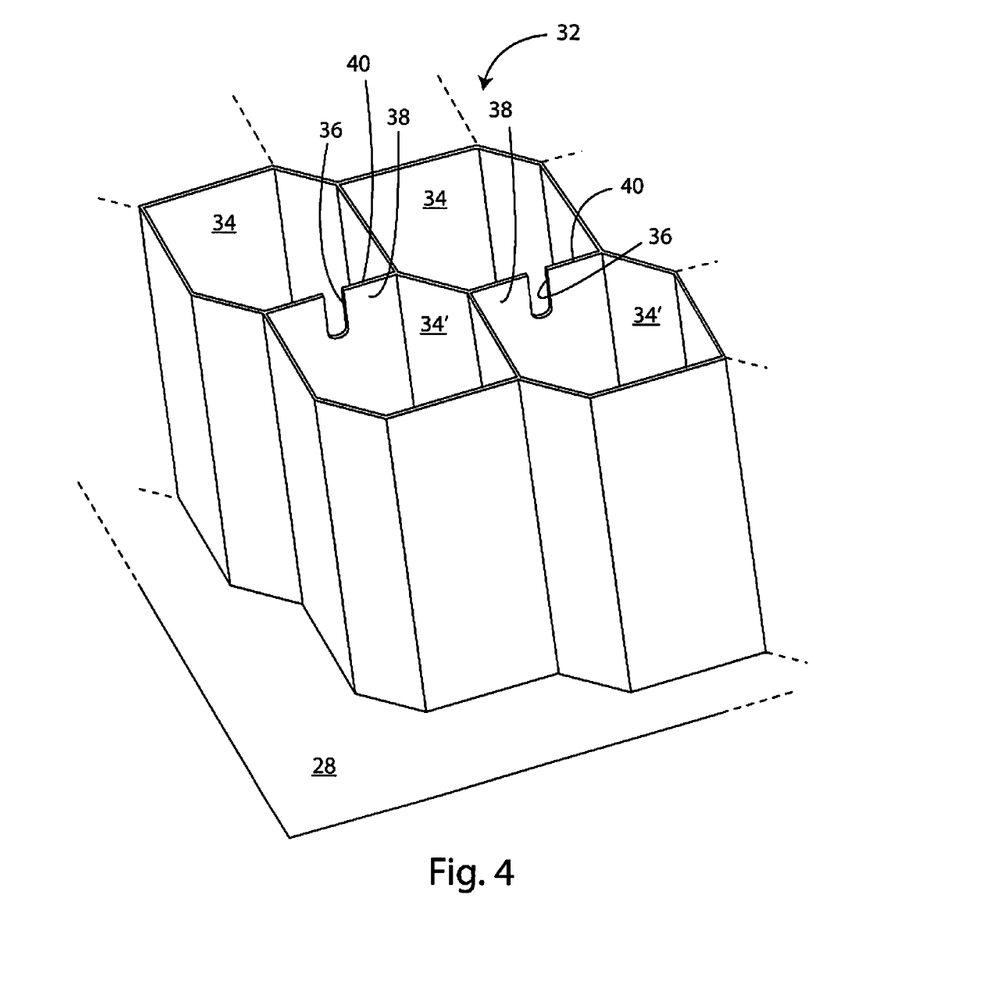
FIG. 4 is a detailed perspective view of some technical details of the element for sound absorption shown in FIG. 2.

With reference to FIGS. 2 to 4, there is schematically shown the structure of an element 26 according to said first embodiment. Element 26 is adapted to dampen sound and noise generated during the operation of propulsion assembly 18 of engine nacelle 10.

Element 26 comprises, in a known manner, a front layer (or "face-sheet") 28 and a rear layer (or "back-sheet") 30, between which an intermediate honeycomb layer 32 is "sandwiched". Said sheets 28, 30, 32 are coupled together, e.g. by glueing. In the illustrated embodiment, face-sheet 28 and back-sheet 30 of element 26 have a load-bearing function.

Face-sheet 28 is, at least partly, substantially acoustically permeable or crossable, i.e. it can be passed through by a prevalent portion of the sound waves that hit it from the outside. Face-sheet 28 may be made of a metallic material, e.g. aluminum, or a composite material, e.g. made out of layers of carbon fibre and glass fibre. Preferably, face-sheet 28 has a thickness of approx. 1 mm.

Back-sheet 30 is substantially sound-reflective, i.e. it can reflect or anyway deviate a prevalent portion of the sound waves that hit it. Back-sheet 30 may be made of a metallic material, e.g. aluminum, or a composite material, e.g. made out of layers of carbon fibre and glass fibre. Preferably, the rear layer 30 has a thickness of approx. 1 mm.

As clearly visible in FIG. 3, honeycomb layer 32 defines a mesh structure that has a plurality of hollow cells 34 laterally neighboring one another, e.g. separated by sound-reflective walls. The mutually opposite open axial ends of said cells 34 are covered by the face and back sheets 28, 30. Preferably, cells 34 extend in a direction substantially orthogonal to face and back sheets 28, 30. Preferably, the cross-section of cells 34 is shaped substantially like a regular or irregular polygon, thus forming a substantially honeycomb-like arrangement. In the embodiments described herein, said cross-section is hexagonal, but in further variants (not shown) it may have different shapes, e.g. rectangular or square, thus creating a matrix structure. Honeycomb layer 32 may be made of a metallic material, e.g. aluminum, or a composite material, e.g. made out of layers of glass fibre, or a meta-aramid-based material, e.g. the substance known as Nomex®. Preferably, the honeycomb layer has a thickness in the range of 1 cm to 3-4 cm.

Cells 34 have the function of making the sound waves that enter through face-sheet 28 and are reflected by back-sheet 30 resonate in the cavity defined within their own side walls, thus contributing to absorbing the sound waves produced by propulsion assembly 18.

Element 26 also has a plurality of passages 36, each one of them connecting a plurality or group of cells 34, 34' belonging to honeycomb layer 32. In this manner, cells 34, 34' connected to one another by each passage 36 can acoustically cooperate to improve the noise dampening performance. In fact, as shown in FIG. 2, the sound waves that penetrate through face-sheet 28 and enter cell 34 can also reach and resonate in at least one other cell 34' through the respective passage 36. This increases the degrees of freedom of element 26, hence improving the sound absorbing performance.

Preferably, each group of acoustically cooperating cells 34, 34' comprises—or, more preferably, consists of—a plurality of cells 34, 34' which are laterally adjacent in the mesh structure.

Preferably, each group of acoustically cooperating cells 34, 34' comprises—or, more preferably, consists of—a couple of cells 34, 34', e.g. laterally adjacent to each other, in the mesh structure.

Also preferably, cells 34, 34' belonging to each one of the above-mentioned groups are exclusively connected to each other, without being connected to any other cells 34, 34' belonging to another one of such groups through further passages 36. This creates between cells 34, 34', connected to each other by passages 36, a partition of mutually excluding groups of cells, wherein each group is acoustically independent of the other ones. In the illustrated embodiment, in each one of said groups each cell 34 (34') is connected to and acoustically cooperating with only one other cell 34' (34) through only one of passages 36; in other words, each passage 36 creates a "biunivocal" and exclusive connection between only one interacting pair of cells 34, 34'.

In further variant embodiments (not shown), it is also conceivable that each passage connects more than two cells to one another.

Furthermore, in other variant embodiments (not shown in the drawings), it is also conceivable that a plurality of passages redundantly connect the same two or more cells belonging to the same group.

Advantageously, but not necessarily, the pairs of acoustically cooperating cells 34, 34' are aligned, thus forming parallel rows (represented by means of dashed-dotted lined and indicated as a whole by reference F).

With particular reference to FIGS. 2 and 4, passages 36 are preferably obtained in honeycomb layer 32, e.g. in the proximity of back-sheet 30. More preferably, each passage is provided in the form of an opening 36 passing through a substantially sound-reflective delimiting wall 38, defined in honeycomb layer 32 and positioned between acoustically cooperating cells 34, 34'.

Preferably, delimiting wall 38 has a top (to which no reference numeral has been assigned), on which face-sheet 28 rests, and a bottom 40 (only visible in FIG. 4), which rests on back-sheet 30. In the illustrated embodiments, said opening is a groove or notch 36 obtained in bottom 40 of delimiting wall 38, e.g. in a median section thereof. As an alternative, said opening may be a through hole that passes through the delimiting wall, e.g. in a central portion thereof.

In alternative variants (not shown), the passages may also be obtained in back-sheet 30, e.g. by creating thereon grooves or channels communicating with groups of cells 34, 34', e.g. laterally adjacent ones.

With reference to FIG. 2, in this first embodiment face-sheet 28 has a plurality of acoustically permeable portions 42 and a plurality of sound-reflective portions 44. In this case, each group of acoustically cooperating cells 34, 34' has one cell 34 facing the acoustically permeable portion 42 and the other cell 34' facing sound-reflective portion 44. Of course, in other variant embodiments, wherein the group of acoustically cooperating cells includes a number of cells greater than two, it is conceivable that a plurality of cells belonging to said group face one or more respective acoustically permeable portions and/or that a plurality of other cells belonging to said group face one or more respective sound-reflective portions.

In the embodiment show herein, acoustically permeable portions 42 and sound-reflective portions 44 are alternately arranged on face-sheet 28. Preferably, the alternation between acoustically permeable portions 42 and sound-reflective portions 44 follows a chessboard-like alternating layout.

Preferably, acoustically permeable portions 42 are porous, e.g. with holes or micro-holes. For example, each one of the acoustically permeable portions 42 has a plurality of holes with a diameter of 1 mm to 1.5 mm, which define an open surface porosity of 7-8% of the total area. Still by way of example, in each one of acoustically permeable portions 42, the hole layout may follow a regularly repeated scheme.

In this embodiment, face-sheet 28 comprises a band of sound-reflective material, wherein acoustically permeable portions 42 are obtained, for example, by perforating said band.

FIGS. 5 to 12 show a plurality of further exemplary embodiments of an element for sound absorption according to the present invention. Those parts or elements which are similar to or which perform the same function as those of the above-described embodiment have been assigned the same reference numerals. For simplicity, the description of such parts or elements will not be repeated below, and reference will be made to the above description of the first embodiment, pointing out analogies and differences thereof.

Figure 5:
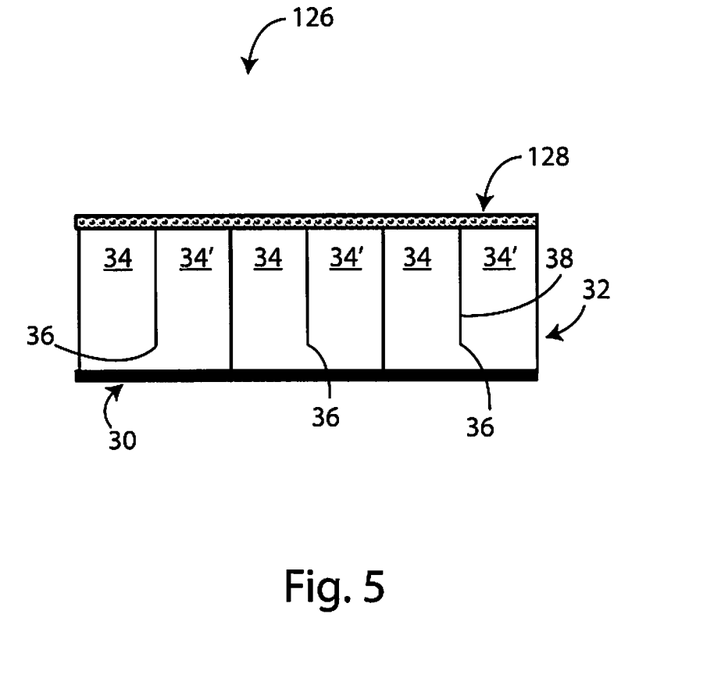
FIGS. 5 to 12 are schematic cross-sectional views, wherein each figure represents a respective further exemplary embodiment of an element for sound absorption according to the present invention.

With reference to FIG. 5, reference numeral 126 indicates a second exemplary embodiment of an element for sound absorption according to the present invention. Unlike the first embodiment, element 126 has a face-sheet 128 which is acoustically permeable. Preferably, the face-sheet comprises a band of sound-reflective material, across the whole length of which a plurality of holes have been drilled.

Figure 6:
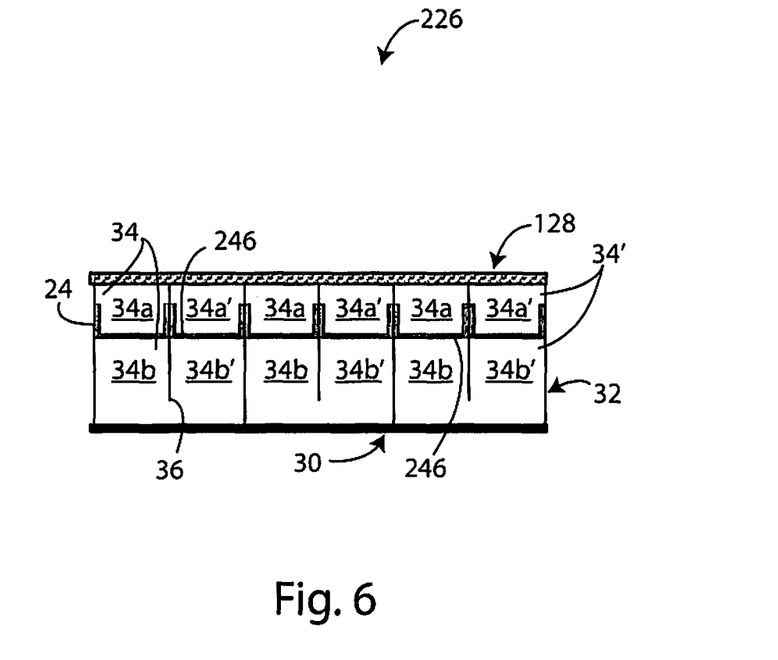

With reference to FIG. 6, reference numeral 226 indicates a third exemplary embodiment of an element for sound absorption according to the present invention.

Unlike the first and second embodiments, element 226 comprises a dividing region positioned in intermediate layer 32, which transversally divides both cells 34, 34' of each group of acoustically cooperating cells 34, 34' into respective front sections 34a, 34a', located between the dividing region and front layer 128, and respective rear sections 34b, 34b', located between the dividing region and back-sheet 30. Advantageously, two mesh half-structures are thus obtained, wherein the first mesh half-structure is formed by front sections 34a, 34a' and the second mesh half-structure is formed by rear sections 34b, 34b'. Preferably, the front sections 34a, 34a' and the respective rear sections 34b, 34b' of the mesh half-structures substantially match and align with each other.

In this embodiment, the dividing region comprises a plurality of intermediate dividers 246, each of which is housed in respective cell 34, 34' divided by it into the respective front section 34a, 34a' and the respective rear section 34b, 34b'. As shown in FIG. 6, intermediate dividers 246 are positioned in respective cells 34, 34', substantially at the same height or level from the back-sheet 30. In this embodiment, intermediate dividers 246 prevalently have sound-absorbing characteristics, e.g. they may comprise a fabric or a perforated or microperforated layer. The acoustic characteristics of each intermediate divider 246 can be determined as a function of the type of material, of the porosity thereof, and of the position of each intermediate divider 246 in respective cell 34, 34'.

One of the advantages deriving from the use of intermediate dividers 246 is that intermediate element 226 can ensure acoustic responses which are suitable for deadening different noise sources, e.g. having different frequencies.

According to an alternative variant (not shown), said dividing region may comprise a sheet of material acting as a separator wall between two transversally separated honeycomb half-layers.

According to a further alternative embodiment (not shown), delimiting wall 38 may end and be absent in the region of rear sections 34b e 34b', passage 36 thus consisting of the free area between rear section 34b and rear section 34b'.

Figure 7:
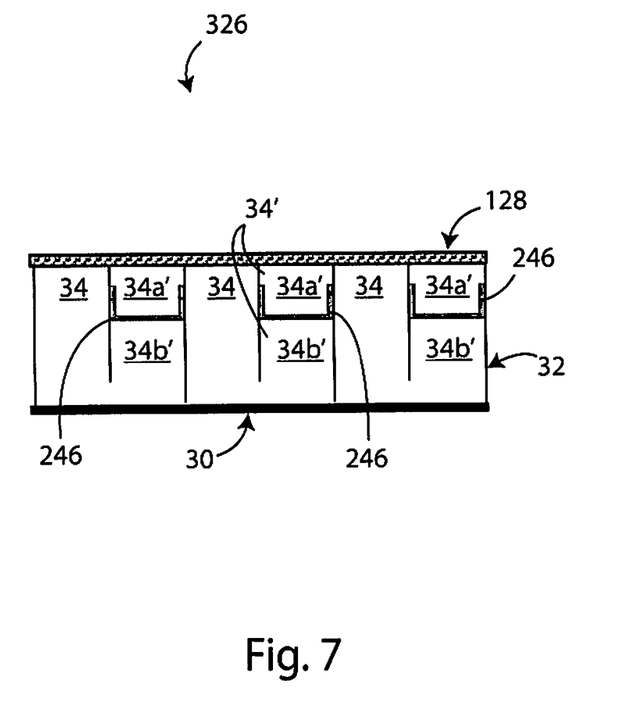

With reference to FIG. 7, reference numeral 326 indicates a fourth exemplary embodiment of an element for sound absorption according to the present invention. Unlike the third embodiment, only a part of cells 34, 34' of the mesh structure are divided by the dividing region, e.g. only some of cells 34, 34' house intermediate dividers 246.

Preferably, each group of acoustically cooperating cells 34, 34' includes only one cell 34' divided by the dividing region, respectively into front section 34a' and rear section 34b'. In the illustrated embodiment, element 326 actually has a plurality of intermediate dividers 246, wherein each of them is positioned in just one cell 34' of a respective group of acoustically cooperating cells 34, 34'.

In this embodiment, intermediate dividers 246 are present in alternating fashion in cells 34, 34' according to a predetermined layout, e.g. a chessboard-like alternating layout.

According to a further alternative variant embodiment (not shown), delimiting wall 38 may end and be absent in the region of rear sections 34b', passage 36 thus consisting of the free area between cell 34 and rear section 34b'.

Figure 8:
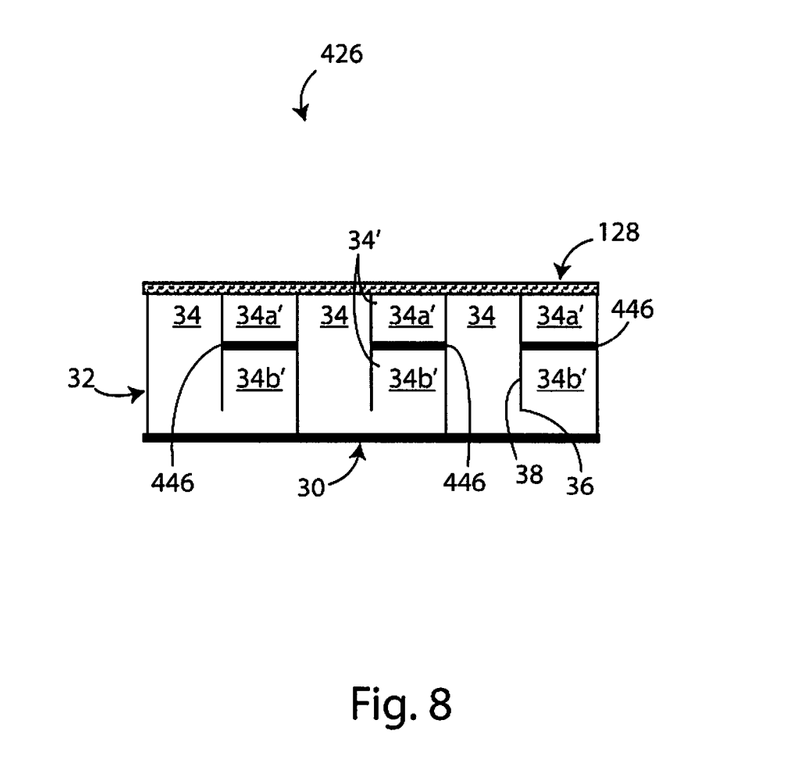

With reference to FIG. 8, reference numeral 426 indicates a fifth exemplary embodiment of an element for sound absorption according to the present invention. Element 426 is substantially similar to the one of the fourth embodiment shown in FIG. 7. However, unlike the fourth embodiment, the intermediate dividers, referred to as 446, are substantially sound-reflective.

According to a further alternative variant embodiment (not shown), delimiting wall 38 may end and be absent in the region of rear sections 34b', passage 36 thus consisting of the free area between cell 34 and rear section 34b'.

Figure 9:
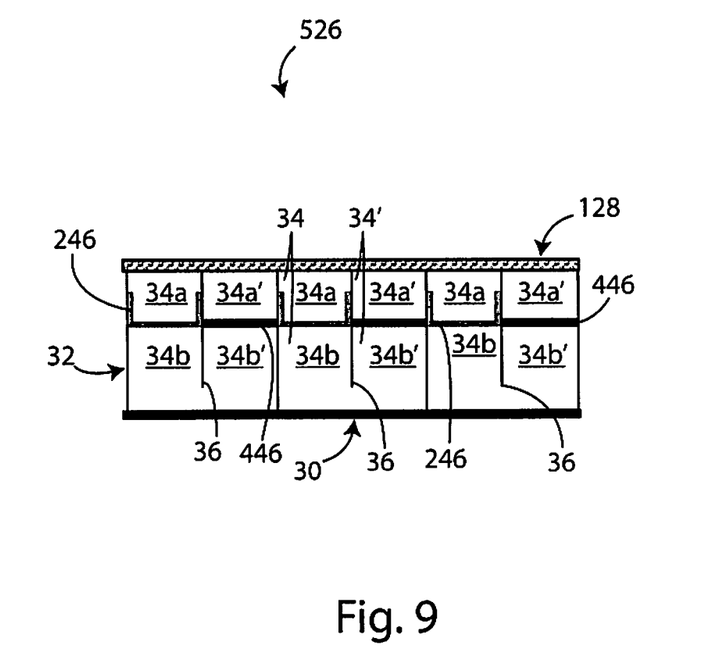

With reference to FIG. 9, reference numeral 526 indicates a sixth exemplary embodiment of an element for sound absorption according to the present invention. In this embodiment, a part of the cells (indicated by 34) of the mesh structure are divided by respective substantially sound-absorbing intermediate dividers 246, whereas another part of the cells (indicated by 34') are divided by respective substantially sound-reflective intermediate dividers 446.

Preferably, as shown in FIG. 9, each group of cells 34, 34' includes one cell 34 in which there is a substantially sound-absorbing intermediate divider 246 and one other cell 34' in which there is another substantially sound-reflective intermediate divider 446. The substantially sound-absorbing intermediate divider 246 is preferably similar to those shown in FIGS. 6 and 7, and the substantially sound-reflective intermediate divider 446 is preferably similar to those shown in FIG. 8. In the illustrated embodiment, the substantially sound-absorbing intermediate dividers 246 and the second substantially sound-reflective intermediate dividers 446 alternate in cells 34, 34' according to a predetermined layout, e.g. a chessboard-like layout.

According to a further alternative variant embodiment (not shown), delimiting wall 38 may end and be absent in the region of rear sections 34b e 34b', passage 36 thus consisting of the free area between rear section 34b and rear section 34b'.

Figure 10:
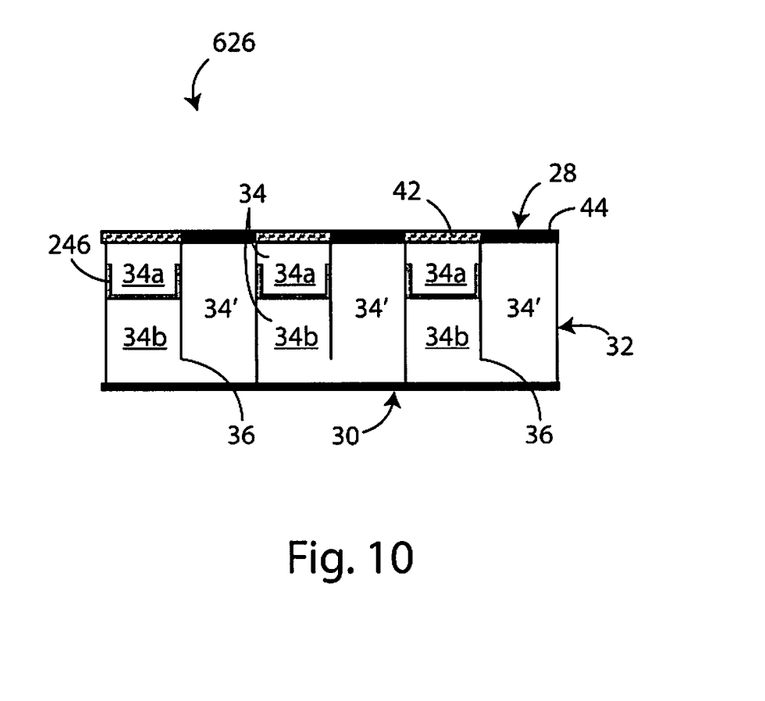

With reference to FIG. 10, reference numeral 626 indicates a seventh exemplary embodiment of an element for sound absorption according to the present invention. Unlike the fourth embodiment shown in FIG. 7, element 626 has a face-sheet 28 which is similar to the one of the first embodiment (FIG. 4). In this embodiment, cells 34 facing the acoustically permeable portions 42 contain intermediate dividers 246, whereas cells 34' facing sound-reflective portions 44 have no intermediate dividers 246.

According to a further alternative variant embodiment (not shown), delimiting wall 38 may end and be absent in the region of rear sections 34b, passage 36 thus consisting of the free area between cell 34' and rear section 34b.

Figure 11:
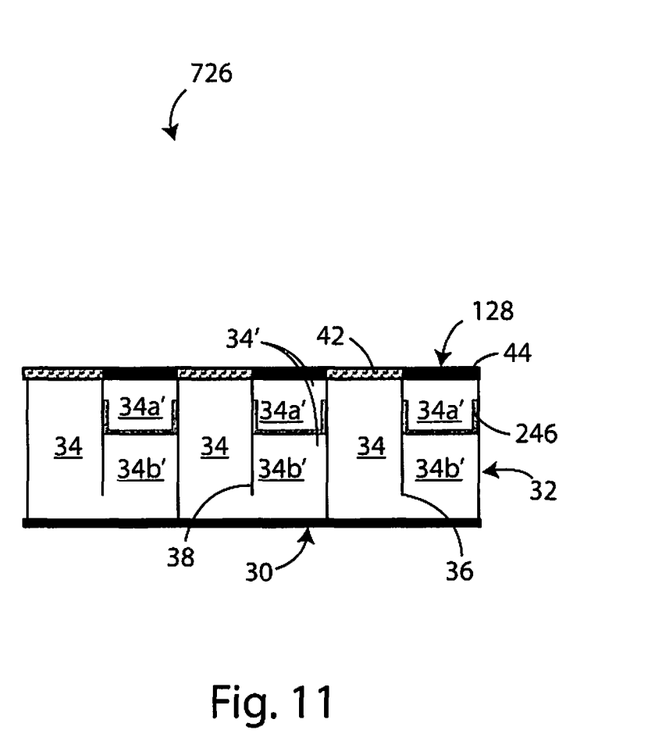

With reference to FIG. 11, reference numeral 726 indicates an eighth exemplary embodiment of an element for sound absorption according to the present invention. Unlike the seventh embodiment shown in FIG. 10, cells 34 facing acoustically permeable portions 42 have no intermediate dividers 246, whereas cells 34' facing sound-reflective portions 44 contain intermediate dividers 246.

According to a further alternative variant embodiment (not shown), delimiting wall 38 may end and be absent in the region of rear sections 34b', passage 36 thus consisting of the free area between cell 34 and rear section 34b'.

Figure 12:
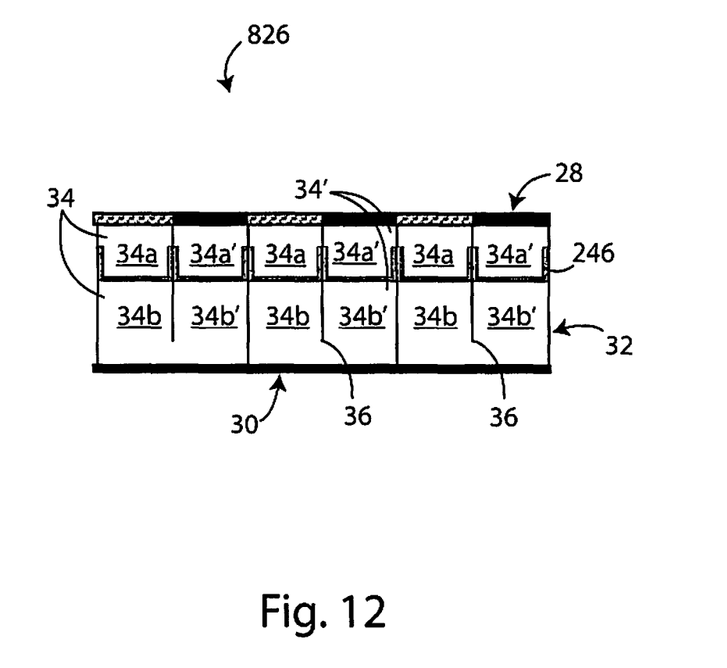

With reference to FIG. 12, reference numeral 826 indicates a ninth exemplary embodiment of an element for sound absorption according to the present invention. Unlike the eighth and seventh embodiments, all (in this case, both) cells 34, 34' belonging to the same group of acoustically cooperating cells 34, 34' are fitted with substantially sound-absorbing intermediate dividers 246.

In this embodiment, all cells 34, 34' of the mesh structure are fitted with intermediate dividers 246. As described with reference to the third embodiment shown in FIG. 6, the dividing region may comprise, instead of the plurality of intermediate dividers, a sheet of material acting as a separator wall.

According to a further alternative variant embodiment (not shown), delimiting wall 38 may end and be absent in the region of rear sections 34b e 34b', passage 36 thus consisting of the free area between rear section 34b and rear section 34b'.

Of course, without prejudice to the principle of the invention, the forms of embodiment and the implementation details may be extensively varied from those described and illustrated herein by way of non-limiting example, without however departing from the scope of the invention as set out in the appended claims.

For example, a man skilled in the art will appreciate that the numerous embodiments of the element for sound absorption according to the present invention can also be installed on engine nacelles of different types than the one shown in FIG. 1, as well as on aircraft components other than engine nacelles. Furthermore, the technical characteristics that differentiate the various embodiments and variants thereof described and illustrated herein are freely interchangeable, whenever compatible.

Also, in the illustrated embodiments the intermediate dividers have been shown as located at the same height within the respective cells. However, the intermediate dividers may also be arranged at different levels within the respective cells.

The invention claimed is:

1. An engine nacelle comprising:
   a cowling having a substantially barrel shape, said cowling having a through cavity extending in a substantially axial direction; said cowling has an outer barrel facing outward and an inner barrel surrounding said through cavity; said cowling having an air intake located at one end of said through cavity for conveying external air into said cowling;
   a first single element for sound absorption forming an inlet ring, the inlet ring comprising the inner barrel in an inlet region of said cowling; and
   a second single element for sound absorption forming an outlet ring, the outlet ring comprising the inner barrel in an outlet region of said cowling;
   each of said first and second single elements for sound absorption comprising:
   a face-sheet, which is, at least in a region thereof, acoustically permeable;
   a substantially sound-reflective back-sheet;
   a honeycomb layer interposed between said face-sheet and said back-sheet and defining a mesh structure which has a plurality of hollow cells laterally adjacent one another, wherein mutually opposite open axial ends of said cells are covered by the face sheet and the back-sheet; said cells being adapted to make sound waves that enter through said face-sheet and are reflected by back-sheet resonate inside side walls;
   at least one notch formed on a bottom of said honeycomb layer and positioned between said cells, said bottom resting on said back-sheet; said notch connecting together a group comprising a pair of said cells that are laterally adjacent in said mesh structure and passing through at least one delineating wall, thereby causing said cells to acoustically cooperate with one another; and
   an intermediate divider positioned in the honeycomb layer and housed in one of said acoustically cooperating cells, wherein said intermediate divider divides said one of said acoustically cooperating cells;
   wherein said face-sheet has at least one acoustically permeable portion capable of being passed through by a prevalent portion of the incident sound waves, and at least one acoustically reflective portion; said group of acoustically cooperating cells including at least one cell facing said acoustically permeable portion and at least one other cell facing said acoustically reflective portion.

2. The nacelle according to claim 1, wherein said intermediate divider is substantially sound-absorbing.

3. The nacelle according to claim 1, wherein said intermediate divider is substantially sound-reflective.

4. Aircraft comprising a nacelle according to claim 1.

5. An engine nacelle comprising: a cowling having a substantially barrel shape, said cowling having a through cavity extending in a substantially axial direction; said cowling has an outer barrel facing outward and an inner barrel surrounding said through cavity; said cowling having an air intake located at one end of said through cavity for conveying external air into said cowling; a first single element for sound absorption forming an inlet ring, the inlet ring comprising the inner barrel in an inlet region of said cowling; and a second single element for sound absorption forming an outlet ring, the outlet ring comprising the inner barrel in an outlet region of said cowling; each of said first and second single elements for sound absorption comprising: a face-sheet, which is, at least in a region thereof, acoustically permeable; a substantially sound-reflective back-sheet; a honeycomb layer interposed between said face-sheet and said back-sheet and defining a mesh structure which has a plurality of hollow cells laterally adjacent one another, wherein mutually opposite open axial ends of said cells are covered by the face sheet and the back-sheet; said cells being adapted to make sound waves that enter through said face-sheet and are reflected by back-sheet resonate inside side walls; at least one notch formed on a bottom of said honeycomb layer and positioned between said cells, said bottom resting on said back-sheet; said notch connecting together a group comprising a pair of said cells that are laterally adjacent in said mesh structure and passing through at least one delineating wall, thereby causing said cells to acoustically cooperate with one another; and an intermediate divider positioned in the honeycomb layer and housed in one of said acoustically cooperating cells, wherein said intermediate divider divides said one of said acoustically cooperating cells; wherein said group of acoustically cooperating cells includes at least one cell in which there is a first substantially sound-absorbing intermediate divider, and at least one other cell in which there is a second substantially sound-reflective intermediate divider.

* * * * *